(12) United States Patent
Yarnot et al.

(10) Patent No.: US 12,286,944 B2
(45) Date of Patent: Apr. 29, 2025

(54) CATALYTIC THRUSTER

(71) Applicant: Aerojet Rocketdyne, Inc., Sacramento, CA (US)

(72) Inventors: Vincent C. Yarnot, Sacramento, CA (US); Steven Stanley, Sacramento, CA (US); Garrett Urban, Sacramento, CA (US); Matthew T. Jakubek, Sacramento, CA (US); Ronald L. Argust, Sacramento, CA (US)

(73) Assignee: Aerojet Rocketdyne, Inc., Sacramento, CA (US)

( * ) Notice: Subject to any disclaimer, the term of this patent is extended or adjusted under 35 U.S.C. 154(b) by 129 days.

(21) Appl. No.: 17/641,961

(22) PCT Filed: Nov. 22, 2019

(86) PCT No.: PCT/US2019/062788
§ 371 (c)(1),
(2) Date: Mar. 10, 2022

(87) PCT Pub. No.: WO2021/101568
PCT Pub. Date: May 27, 2021

(65) Prior Publication Data
US 2022/0307450 A1    Sep. 29, 2022

(51) Int. Cl.
*F02K 9/52*    (2006.01)
*B33Y 10/00*   (2015.01)
*F02K 9/62*    (2006.01)

(52) U.S. Cl.
CPC ........... *F02K 9/52* (2013.01); *B33Y 10/00* (2014.12); *F02K 9/62* (2013.01); *F05D 2230/232* (2013.01); *F05D 2230/30* (2013.01)

(58) Field of Classification Search
CPC ............... F02K 9/52; F02K 9/62; F02K 9/68
See application file for complete search history.

(56) References Cited

U.S. PATENT DOCUMENTS

| | | | | |
|---|---|---|---|---|
| 4,324,096 A * | 4/1982 | Ellion | ......... | F02K 9/68 60/218 |
| 4,352,782 A | 10/1982 | Daly | | |
| 4,930,310 A * | 6/1990 | McKevitt | ......... | F02K 9/50 60/770 |

(Continued)

FOREIGN PATENT DOCUMENTS

| | | |
|---|---|---|
| CN | 109296474 A | 2/2019 |
| KR | 101969901 B1 | 4/2019 |

(Continued)

OTHER PUBLICATIONS

ESA "Ten ways 3D printing could change space" (Year: 2014).*

(Continued)

*Primary Examiner* — David P. Olynick
(74) *Attorney, Agent, or Firm* — Carlson, Gaskey & Olds, P.C.

(57) ABSTRACT

A monopropellant thruster according to an exemplary aspect of the present disclosure includes, among other things, a first part having a catalyst bed, a thrust chamber, and a nozzle. The first part is integrally formed via a single additive manufacturing process. The thruster further includes a second part, which is a closeout. A method is also disclosed.

20 Claims, 5 Drawing Sheets

(56) References Cited

U.S. PATENT DOCUMENTS

| | | | | |
|---|---|---|---|---|
| 5,787,702 | A | * | 8/1998 | Tiedtke .................... F02K 9/52 |
| | | | | 60/257 |
| 5,941,062 | A | * | 8/1999 | Koppel .................... F02K 9/46 |
| | | | | 60/258 |
| 2009/0120060 | A1 | * | 5/2009 | Coste ....................... F02K 9/68 |
| | | | | 60/257 |
| 2017/0284339 | A1 | * | 10/2017 | Koehler .................... F02K 9/26 |
| 2018/0112628 | A1 | * | 4/2018 | Anflo ....................... F02K 9/52 |

FOREIGN PATENT DOCUMENTS

| | | |
|---|---|---|
| RU | 2158666 C2 | 11/2000 |
| RU | 2771220 C1 | 4/2022 |

OTHER PUBLICATIONS

International Search Report and Written Opinion for PCT/US2019/062788 dated Jul. 27, 2020.

Essa K et al: "Development and testing of an additively manufactured monolithic catalyst bed for HTP thruster applications", Applied Catalysis A: General, Elsevier, Amsterdam, NL, vol. 542, May 25, 2017 (May 25, 20L7).

* cited by examiner

CATALYTIC THRUSTER

BACKGROUND

Catalytic thrusters are used on satellites and other aerospace vehicles for adjusting vehicle position, for example. Such thrusters can include a thrust chamber that holds a catalyst, and a feed tube for delivering propellant into the thrust chamber. The propellant reacts in the presence of the catalyst to generate a gas that is expelled through a nozzle to generate thrust.

SUMMARY

A monopropellant thruster according to an exemplary aspect of the present disclosure includes, among other things, a first part having a catalyst bed, a thrust chamber, and a nozzle. The first part is integrally formed via a single additive manufacturing process. The thruster further includes a second part, which is a closeout.

In a further non-limiting embodiment of the foregoing thruster, one of the first part and the second part has an injector.

In a further non-limiting embodiment of any of the foregoing thrusters, one of the first part and the second part has a thruster mount.

In a further non-limiting embodiment of any of the foregoing thrusters, the first part includes an outer body of the thruster and a feed tube.

In a further non-limiting embodiment of any of the foregoing thrusters, the feed tube includes a main passageway section extending from a feed tube inlet to a plurality of branches extending from the main passageway.

In a further non-limiting embodiment of any of the foregoing thrusters, the plurality of branches are spaced-apart from one another about a central axis of the thruster and are inclined relative to the central axis of the thruster.

In a further non-limiting embodiment of any of the foregoing thrusters, each of the plurality of branches is split into two sections leading to a feed tube outlet.

In a further non-limiting embodiment of any of the foregoing thrusters, the first part includes a hollow cylindrical section feed tube outlet and the catalyst bed.

In a further non-limiting embodiment of any of the foregoing thrusters, the catalyst bed is substantially frusto-conically shaped.

In a further non-limiting embodiment of any of the foregoing thrusters, the catalyst bed includes a plurality of orifices permitting fluid flow from the catalyst bed to the nozzle.

In a further non-limiting embodiment of any of the foregoing thrusters, the first part includes a bed flow spike having a surface exhibiting an increasing slope as the surface extends toward the central axis of the thruster.

In a further non-limiting embodiment of any of the foregoing thrusters, the outer body includes an attachment section, a structural support, and a nozzle.

In a further non-limiting embodiment of any of the foregoing thrusters, the first part includes a heat shield within the chamber.

In a further non-limiting embodiment of any of the foregoing thrusters, the first part is attached to the second part by welding.

In a further non-limiting embodiment of any of the foregoing thrusters, a catalyst is in the catalyst bed.

A method according to an exemplary aspect of the present disclosure includes forming a first part of a thruster by additively manufacturing a catalyst bed together with a thrust chamber and a nozzle, and attaching a second part of the thruster to the first part, wherein the second part is a closeout.

In a further non-limiting embodiment of the foregoing method, the attaching step includes welding the second part to the first part.

In a further non-limiting embodiment of any of the foregoing methods, the method includes adding catalyst into the catalyst bed between the forming and attaching steps.

DETAILED DESCRIPTION

Figure 1:
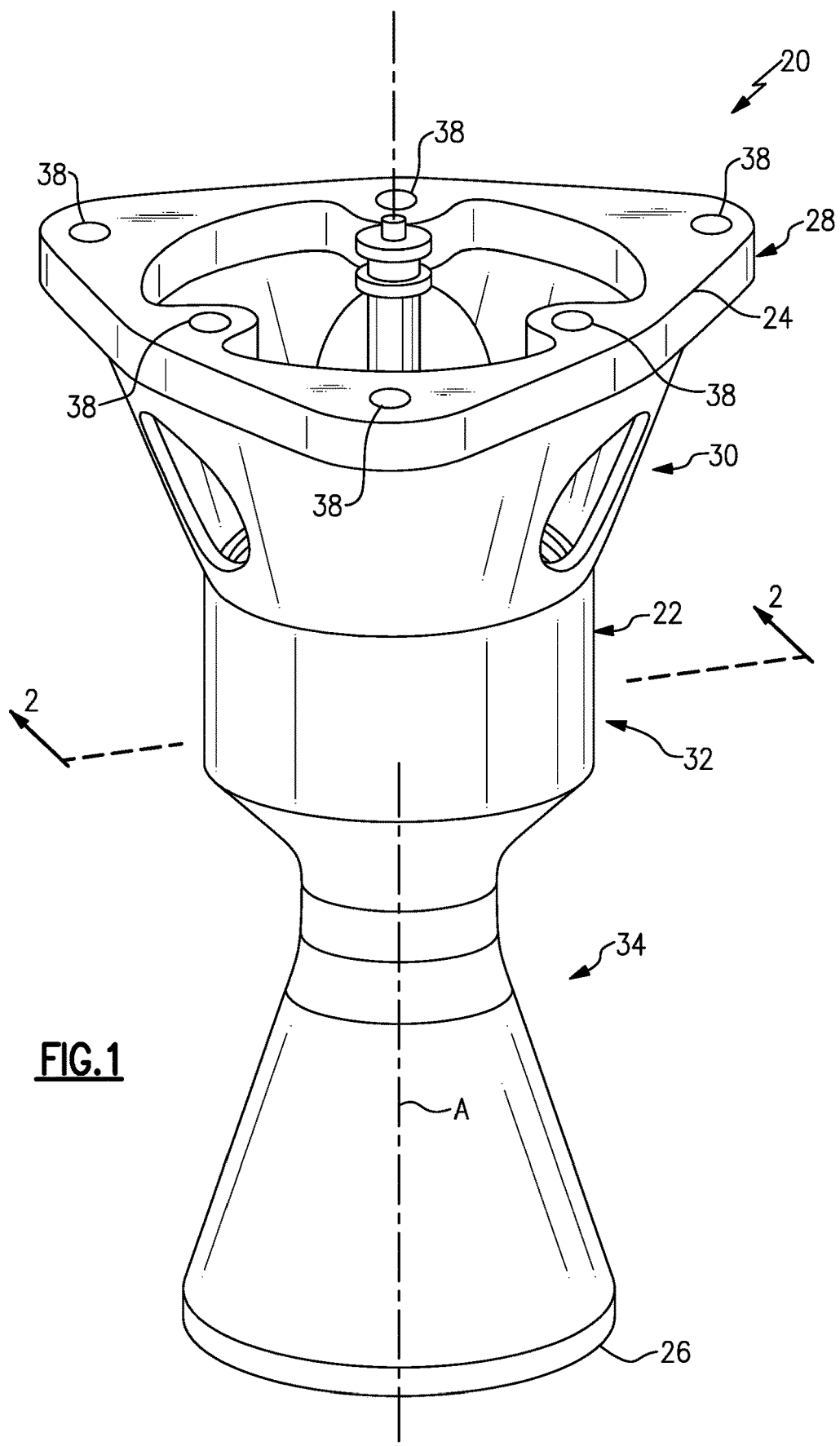
FIG. 1 illustrates an example thruster.

FIG. 1 illustrates an example monopropellant catalytic thruster 20 ("thruster 20") arranged along a central axis A. The thruster 20 may be attached to a satellite, rocket, or another type of aerospace vehicle, and may be used as a part of a reaction control system, for example. The thruster 20 is not limited to use with aerospace vehicles, and may be used relative to land vehicles or marine vehicles.

The thruster 20 includes an outer housing 22 that spans between first and second opposed ends 24, 26. Moving axially from the first end 24, the thruster includes an attachment section 28, a structural support 30, a thrust chamber 32, and a nozzle 34 terminating at the second end 26. The thrust chamber 32 contains a catalyst bed 36 (FIG. 2) of catalyst granules (not shown), such as iridium based catalyst granules, that fill the volume within the catalyst bed 36. Additional details of the thrust chamber 32 and catalyst bed 36 will be discussed below.

With reference back to FIG. 1, thruster 20 is mountable to an object, such as a rocket or other vehicle, via the attachment section 28. The thruster mount, or attachment section, 28 may include a plurality of openings 38 configured to receive a fastener and thereby facilitate attachment of the thruster 20 to the rocket or other vehicle.

The thruster 20 generally reduces in diameter throughout the structural support 30. Specifically, the thruster 20 generally reduces in diameter moving from the attachment section 28 to the thrust chamber 32. In particular, in this example, the structural support 30 is substantially frusto-conically shaped. The structural support 30 could have a different geometry, such as being cylindrical, conical, spherical, etc. The structural support 30 may be located anywhere between the first end 24 and the second end 26.

The thrust chamber 32 exhibits a substantially constant diameter in this example. The nozzle 34 is a convergent-divergent nozzle, in this example, and includes a convergent section 40 (FIG. 2), a throat section 42, and a divergent section 44. The convergent section 40 reduces in diameter extending axially from the thrust chamber 32 to the throat section 42, and the divergent section 44 increases in diameter from the throat section 42 to the second end 26.

Figure 2:
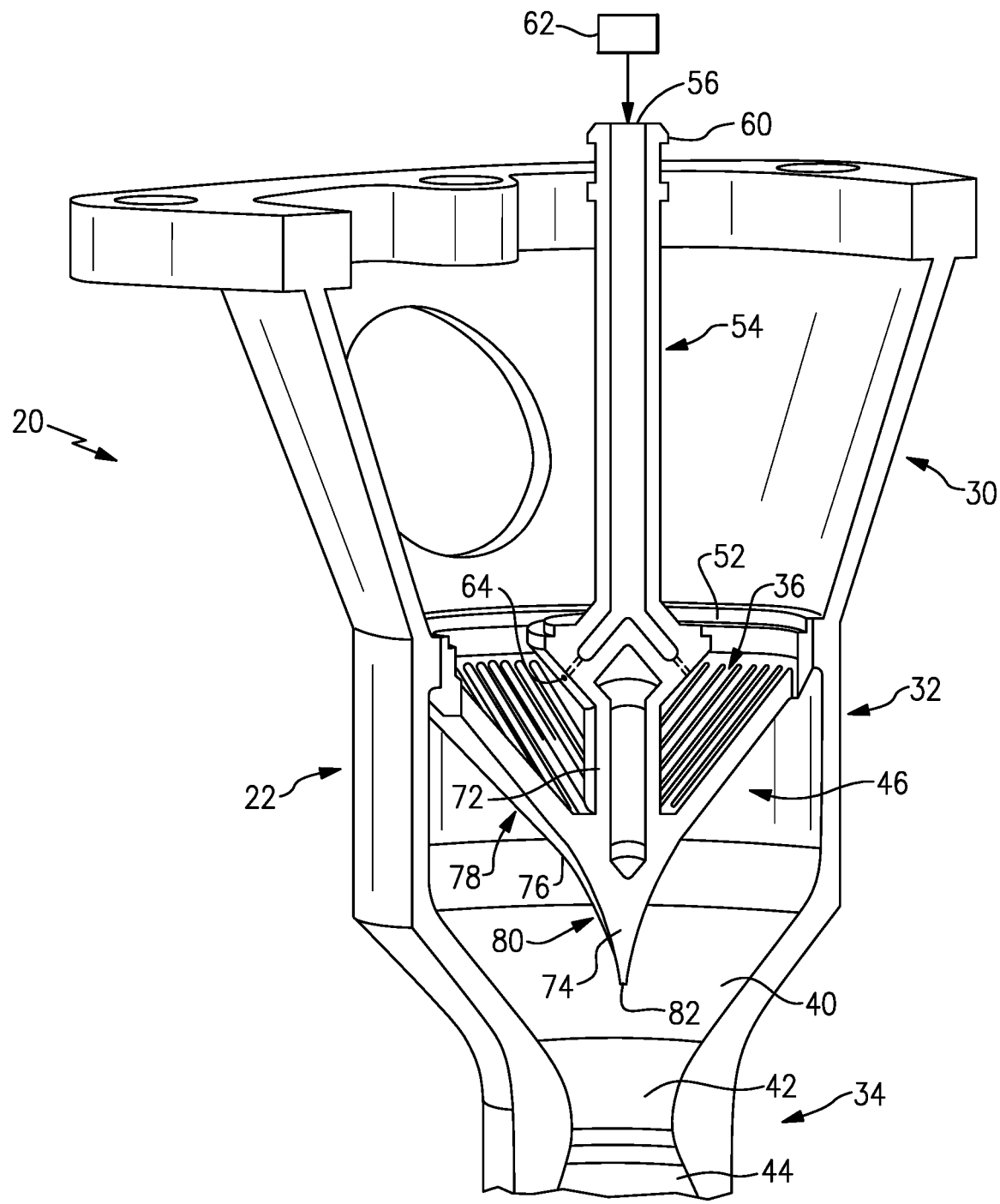
FIG. 2 is a cross-sectional view of a portion of the example thruster.
Figure 3:
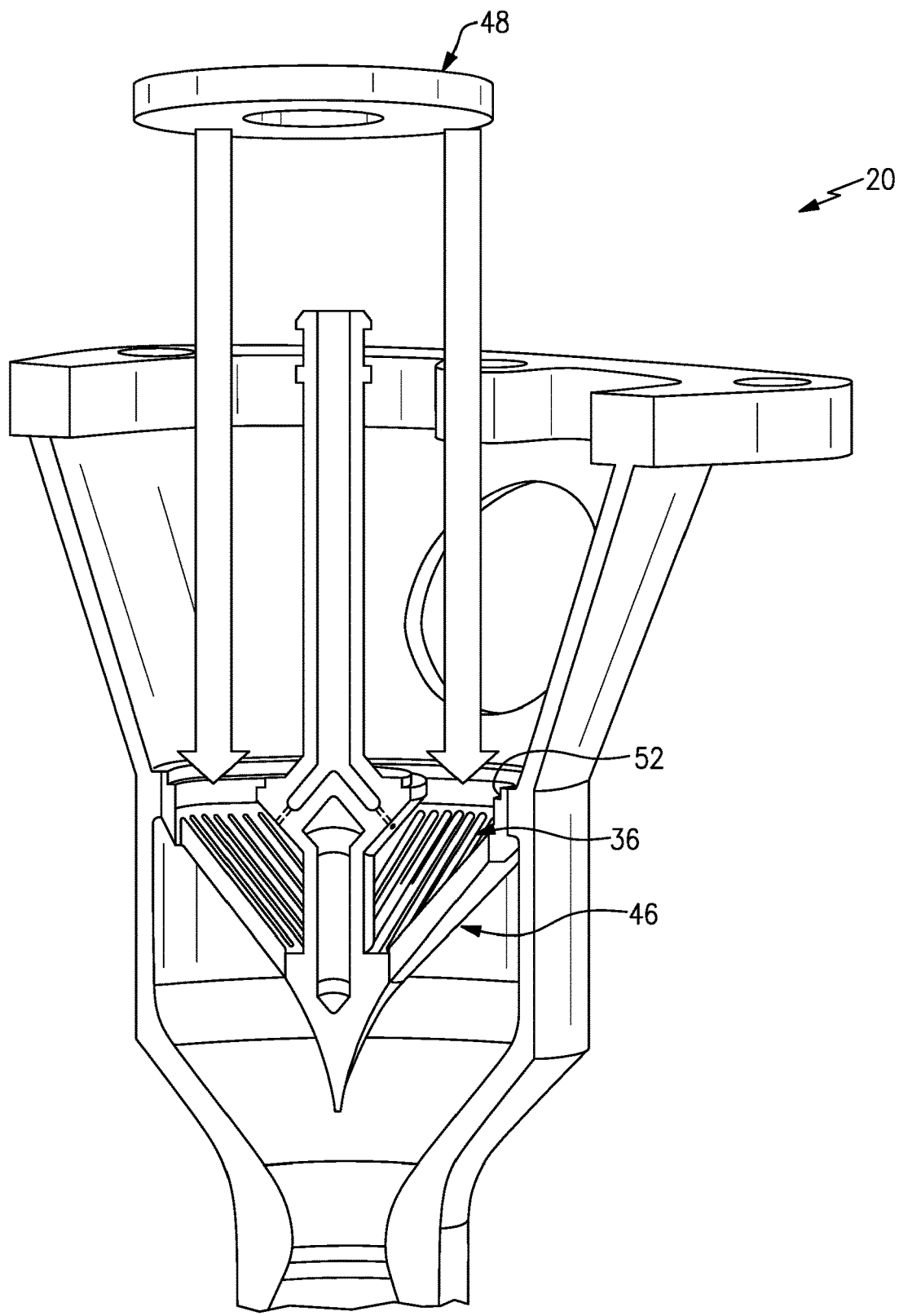
FIG. 3 is an exploded, cross-sectional view of a portion of the example thruster.
Figure 4:
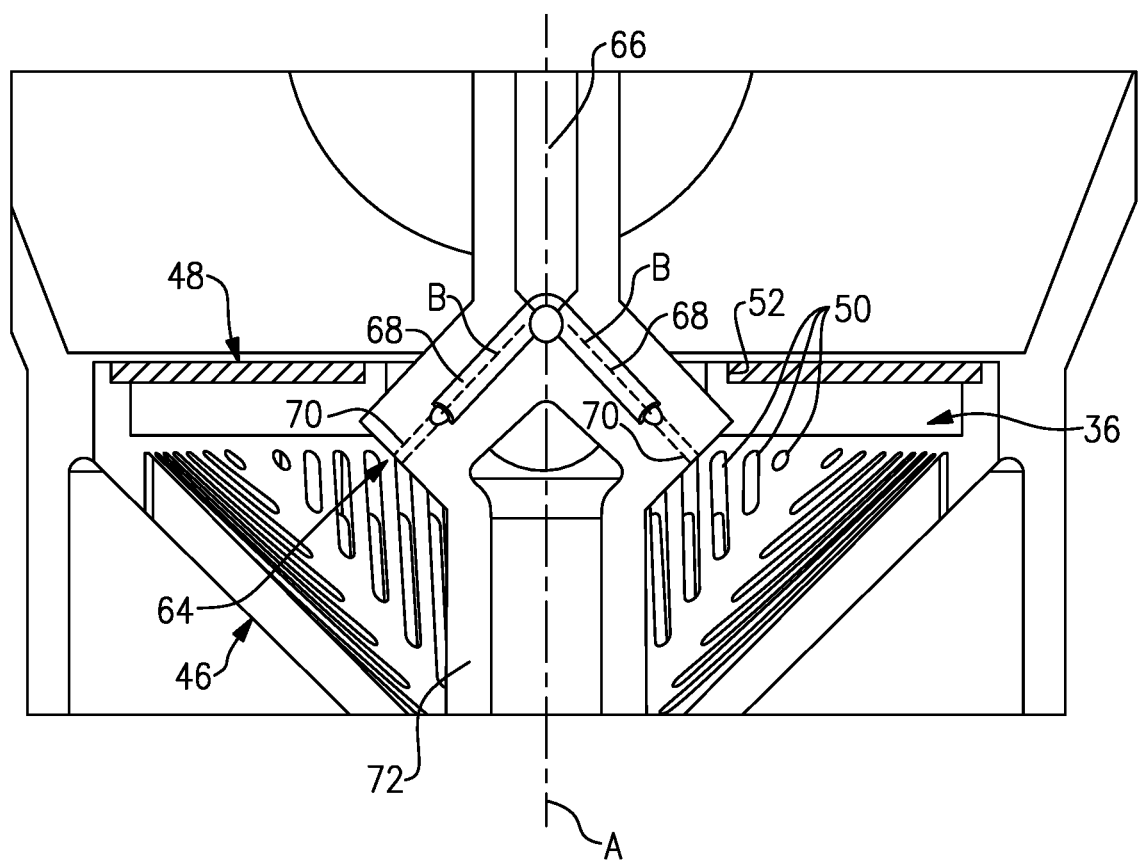
FIG. 4 is a close-up, cross-sectional view of a portion of the example thruster, and in particular illustrates an exemplary arrangement of the catalyst bed relative to the feed tube.

With reference to FIGS. 2-4, the catalyst bed 36 is arranged in the thrust chamber 32, and includes a first part 46 and a second part 48 formed separately from one another. FIG. 3 illustrates the second part 48 before it is attached to the first part 46. The first and second parts 46, 48 may be formed by separate additive manufacturing processes, such as direct metal laser sintering or other known additive manufacturing techniques. Alternatively, the first part 46 is additively manufactured, and the second part 48 may be made using another manufacturing technique.

The first and second parts 46, 48 define the axial and radial boundaries of the catalyst bed 36 in this example. The term "radial" is used herein to refer to a radial direction normal to the central axis A. The first and second parts 46, 48 may be referred to as retention plates, retention cones, retention cylinders, bed plates, bed cones, bed cylinders, etc. The first part 46 is substantially frustoconically shaped and gradually reduces in diameter extending from the structural support 30 to the nozzle 34. The first part 46 includes a plurality of slots and/or orifices 50 configured to retain catalyst, such as catalyst granules, but permit gas to flow therethrough. A substrate for catalyst may be formed integrally with the first part 46 or second part 48, in other examples.

Adjacent the structural support 30, the first part 46 also includes a channel 52 extending circumferentially about the first part 46. The channel 52 is sized and shaped to receive the second part 48. The second part 48 is substantially disc-shaped with a central cylindrical cutout, and is sized and shaped so as to fit within the channel 52. The second part 48 is a closeout, in one example, meaning the second part 48 closes the catalyst bed 36. In this example, catalyst is added to the catalyst bed 36 before the second part 48 is attached to the first part 46. The second part 48 is then attached to the first part 46, such as by welding or another known attachment technique, to close the catalyst bed 36 and retain catalyst in the catalyst bed 36.

In further examples, the second part 48 may include the thruster mount and/or the injector. In still further examples, the first part 46 may include the thruster mount and/or the injector. In yet another example, the thruster mount and/or the injector may be provided partially by the first part 46 and partially by the second part 48.

The first part 46 of the catalyst bed 36 mechanically supports an injector, or feed tube, 54. The feed tube 54 includes an inlet 56 adjacent the attachment section 28. The outer diameter of the feed tube 54 may include attachment features, such as projections 60, configured to mechanically couple to a conduit connected to a source of propellant 62, such as hydrazine, for example. The feed tube 54 is substantially cylindrical and extends from the inlet 56 to an outlet section 64, which fluidly couples the source of propellant 62 to the catalyst bed 36. The outlet section 64 is axially and radially spaced-apart from the first part 46, which permits loading catalyst into the catalyst bed 36 by packing it against the first part 46 as opposed to packing it against the outlet section 64 of the feed tube 54.

The feed tube 54, in this example, includes a main passageway section 66 extending from the inlet 56 toward the outlet section 64 along the central axis A. In the outlet section 64, the main passageway section 66 splits into a plurality of branches 68. The branches 68 extend along axes B which are inclined relative to the central axis A. Further, in this example, each of the branches 68 includes a split section 70 leading directly into the catalyst bed 36. There are four branches 68 circumferentially spaced-apart from one another about the central axis A.

Figure 5:
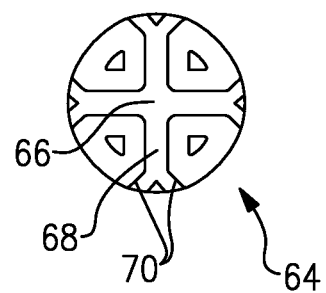
FIG. 5 somewhat schematically illustrates an example arrangement of an outlet section of the feed tube.

The split sections 70 lie in a common plane with the axis B of a respective branch 68, but extend along axes which are inclined relative to the axis B of the respective branch 68. In this example, the branches 68 have a diameter greater than that of the split sections 70 but less than that of the main passageway section 66. FIG. 5 somewhat schematically illustrates the arrangement of the outlet section 64, including the main passageway section 66, branches 68, and split sections 70. The arrangement of the outlet section 64 evenly distributes propellant relative to the catalyst in the catalyst bed 36.

With reference to FIG. 2, a hollow, substantially cylindrical structure 72 projects from the outlet section 64 toward the nozzle 34 along the central axis A. The structure 72 defines a radial inner boundary of the catalyst bed 36. The structure 72 improves heat transfer properties of the thrust chamber 32.

The structure 72 is connected to a bed flow spike 74, which projects axially beyond the catalyst bed 36 and into the convergent section 40 of the nozzle 34. In this respect, when the bed flow spike 74 protrudes through the throat of the nozzle and into the divergent section of the nozzle 34, a portion of the bed flow spike 74 provides a portion of the nozzle 34. The end section of the bed flow spike 74 forming the portion of the nozzle 34 may be truncated in an example. The bed flow spike 74 has an outer surface defined by a gradually increasing slope. In particular, a surface 76, which is partially defined by the first part 46 and the bed flow spike 74 and faces the nozzle 34, has a substantially constant slope along a first section 78, and has a gradually increasing slope along a second section 80 between the first section 78 and a tip 82, which may be sharp or rounded, on the central axis A. The bed flow spike 74 prevents flow separation of fluid exiting the catalyst bed 36 as it enters the nozzle 34. The nozzle 34 may be inclined relative to the central axis A.

During operation, propellant flows from the source 62 through the feed tube 54, along the main passageway section 66, through the branches 68 and split sections 70, and into the catalyst bed 36 where the propellant decomposes in the presence of the catalyst to generate a hot gas that is expelled through the orifices 50 of the first part 46 and then through the nozzle 34 to generate thrust in a known manner by reducing static pressure and accelerating the gas.

Other than the catalyst, the thruster 20 consists of two parts in this example. Namely, the thruster is made of a first part which includes the outer housing 22 and the first part 46, and a second part which is the second part 48. In particular, the first part includes the attachment section 28, the structural support 30, the thrust chamber 32, the nozzle 34, and the first part 46. At least the first part of the thruster 20 may be formed by additive manufacturing. Using such techniques permits the formation of unique geometries, such as the frustoconically-shaped first part 46, the complex geometries of the outlet section 64, and the bed flow spike 74, among others. The first part of the thruster 20 may be additively built beginning with forming the attachment section 28 first and adding additional layers, working toward the nozzle 34, until the entire first part is formed. The first part is an integrally-formed, seamless structure in one example. The only seam in the thruster 20, in one example, is a joint, such as a weld joint, between the first and second parts 46, 48. The first and second parts may be made of a nickel-based alloy, such as alloy A625 for example. The thruster 20 is scalable for use in different applications.

Figure 6:
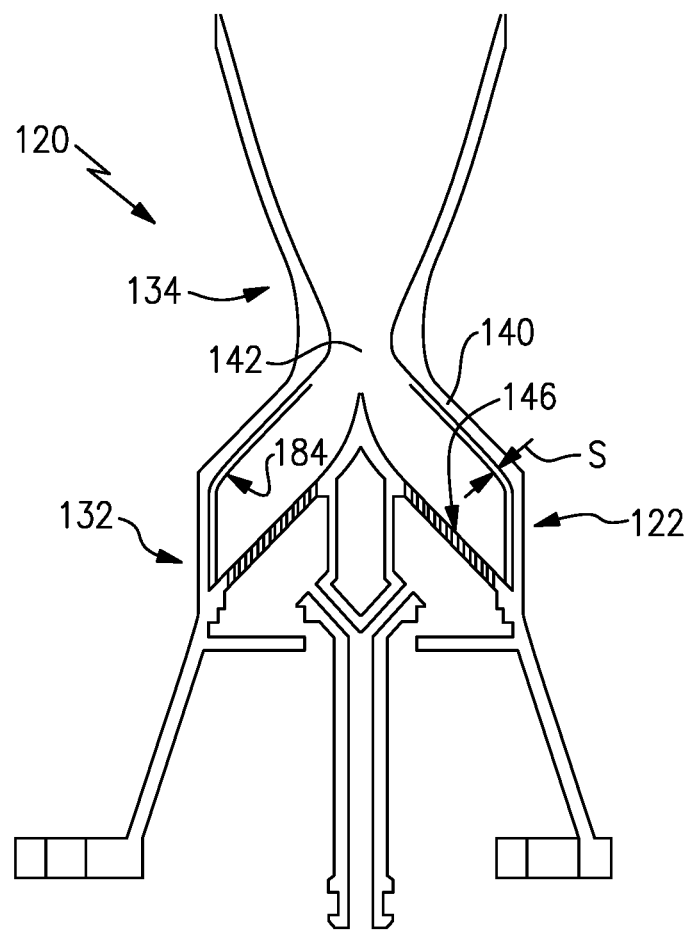
FIG. 6 illustrates another example thruster including a heat shield.

Another example thruster 120 is illustrated in FIG. 6. To the extent not otherwise described or shown, the thruster 120 corresponds to the embodiment of FIGS. 1-5, with like parts having reference numerals preappended with a "1," unless specified otherwise below.

In the example of FIG. 6, the thruster 120 includes a heat shield 184 integrally formed with the first part 146. The heat shield 184 is spaced radially inward of the outer housing 122 by a space S. The space S is substantially constant along the length of the heat shield 184, and the heat shield 184 substantially follows a contour of the thrust chamber 132 and the convergent section 140 of the nozzle 134. The heat shield 184 projects from the first part 146 and has a free end near the throat 142. The heat shield 184 creates space between the hot gases within the thrust chamber 132 and the outer housing 122, which reduces the thermal stresses on the outer housing 122 while at the same time improving the performance of the thruster 120 by preventing heat loss.

It should be understood that except where otherwise noted, terms such as "axial," "radial," and "circumferential" are used above with reference to the normal operational attitude of the thruster 20. Further, these terms have been used herein for purposes of explanation, and should not be considered otherwise limiting. Terms such as "generally," "substantially," and "about" are not intended to be boundaryless terms, and should be interpreted consistent with the way one skilled in the art would interpret those terms.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A monopropellant thruster, comprising:
   a first part including a catalyst bed, a thrust chamber, and a nozzle, wherein the entire first part is integrally formed via a single additive manufacturing process, wherein the first part further includes at least one of an injector, a thruster mount, and a feed tube, and wherein the first part further includes a bed flow spike including a surface exhibiting an increasing slope as the surface extends toward a central axis of the thruster; and
   a second part, wherein the second part is a closeout.

2. The thruster as recited in claim 1, wherein the first part includes an injector.

3. The thruster as recited in claim 2, wherein the first part includes a thruster mount.

4. The thruster as recited in claim 1, wherein the first part includes an outer body of the thruster and a feed tube.

5. The thruster as recited in claim 4, wherein the feed tube includes a main passageway section extending from a feed tube inlet to a plurality of branches extending from the main passageway.

6. The thruster as recited in claim 5, wherein the plurality of branches are spaced-apart from one another about the central axis of the thruster and are inclined relative to the central axis of the thruster.

7. The thruster as recited in claim 6, wherein each branch of the plurality of branches is split into two sections leading to a feed tube outlet.

8. The thruster as recited in claim 6, wherein the first part includes a hollow cylindrical section feed tube outlet and the catalyst bed.

9. The thruster as recited in claim 8, wherein the catalyst bed is substantially frustoconically shaped.

10. The thruster as recited in claim 9, wherein the catalyst bed includes a plurality of orifices permitting fluid flow from the catalyst bed to the nozzle.

11. The thruster as recited in claim 4, wherein the outer body includes an attachment section, a structural support, and the nozzle.

12. The thruster as recited in claim 11, wherein the first part includes a heat shield within the thrust chamber.

13. The thruster as recited in claim 1, wherein the first part is attached to the second part by welding.

14. The thruster as recited in claim 1, further comprising a catalyst in the catalyst bed.

15. A monopropellant thruster, comprising:
   a first part including a catalyst bed, a thrust chamber, and a nozzle, wherein the first part is integrally formed via a single additive manufacturing process; and
   a second part, wherein the second part is a closeout,
   wherein the first part includes an outer body of the thruster and a feed tube,
   wherein the feed tube includes a main passageway section extending from a feed tube inlet to a plurality of branches extending from the main passageway,
   wherein the plurality of branches are spaced-apart from one another about a central axis of the thruster and are inclined relative to the central axis of the thruster,
   wherein the first part includes a hollow cylindrical section feed tube outlet and the catalyst bed, and
   wherein the first part includes a bed flow spike including a surface exhibiting an increasing slope as the surface extends toward the central axis of the thruster.

16. A method, comprising:
   forming a first part of a thruster by additively manufacturing a catalyst bed together with a thrust chamber and a nozzle, and at least one of an injector, a thruster mount, and a feed tube, wherein the entire first part is integrally formed via a single additive manufacturing process;
   attaching a second part of the thruster to the first part, wherein the second part is a closeout; and
   adding catalyst into the catalyst bed between the forming and the attaching.

17. The method as recited in claim 16, wherein the attaching includes welding the second part to the first part.

18. The method as recited in claim 16, wherein a centerline of the nozzle is inclined relative to a central axis of the thruster.

19. The method as recited in claim 16, further comprising forming a catalyst substrate integrally with one of the first part and the second part.

20. The method as recited in claim 16, wherein the first part further includes a bed flow spike including a surface exhibiting an increasing slope as the surface extends toward a central axis of the thruster.

* * * * *